United States Patent

[11] 3,617,176

[72] Inventor Heinz Machatzke
 Leverkusen, Germany
[21] Appl. No. 705,599
[22] Filed Feb. 15, 1968
[45] Patented Nov. 2, 1971
[73] Assignee Farbenfabriken Bayer Aktiengesellschaft
 Leverkusen, Germany

[54] AZO DYESTUFF PREPARATIONS WITH AN ALKALI METAL PHOSPHATE
 3 Claims, No Drawings
[52] U.S. Cl. .................................................. 8/42, 8/579
[51] Int. Cl. ...................................................... D06p 1/10, D06p 1/68
[50] Field of Search ............................................ 8/42, 79, 88, 171, 173

[56] References Cited
UNITED STATES PATENTS
2,749,206  6/1956  Wegmann et al. ............ 8/42

Primary Examiner—Donald Levy
Assistant Examiner—Patricia C. Ives
Attorney—Plumley, Tyner & Sandt ABSTRACT: Cold water-soluble dyestuff compositions containing 1:2 chromium or cobalt complex azo dyestuff free of reactive groups and containing at least one unsubstituted or substituted-sulfonamide group and 10 to 200 parts by weight based on 100 parts of said dyestuff of a solubilizing agent comprising trisodium phosphate or tripotassium phosphate, are disclosed. Optionally, 5 to 300 parts by weight of an anionic dispersing agent, e.g. naphthalene sulfonic acids, can be included. The compositions are especially suitable for dyeing N-containing materials e.g. silk, wool and polyamides.

AZO DYESTUFF PREPARATIONS WITH AN ALKALI METAL PHOSPHATE

The object of the present invention comprises cold water-soluble dyestuff preparations containing per 100 parts by weight of a 1:2 chromium or cobalt complex azo dyestuff which is free from reactive groups and which carries at least one optionally N-alkyl- or -aryl substituted sulfonamide group, 10 to 200 parts by weight of trisodium phosphate or tripotassium phosphate and optionally 5 to 300 parts by weight of an anionic dispersing agent.

Metal complex azo dyestuffs containing sulfonamide groups, as are present in the dyestuff preparations according to the invention, are known in large numbers from the literature, for example from German Pat. Specification Nos. 870,305; 937,367; 940,483; 945,342; 953,827; 1,047,340; 1,072,338; 1,049,021; French Pat. Specification Nos. 1,353,364; 1,380,632; 1,433,756; British Pat. Specification Nos. 741,602; 988,829; Belgian Pat. Specification NOS. 553,658; 566,180; 626,394; 638,213; 643,959; 644,415; 534,106; 531,678; 564,094 and 537,533. In general, the 1:2 chromium or cobalt complex azo dyestuffs are the metal complexes of mono- or disazo dyestuffs which contain 0,0'-dihydroxy-o-hydroxy-o'-amino-, o-hydroxy-o'-alkoxy, o'-carboxy-o'-hydroxy or o-alkoxy-o-'-aminoazo groups as metal complex forming groups (prior to metallization). By definition, the dyestuffs must not contain reactive groups.

If the dyestuff preparations are to be adjusted to a certain strength, there may be added customary diluents (standardizing agents) which do not interfere with the subsequent dyeing process, such as dextrin, saccharose, sodium chloride, sodium sulfate, benzamide, or lignin containing residues or sulfite waste liquor.

Anionic dispersing agents may be present in the dyestuff preparations according to the invention. Preferred anionic dispersing agents are here naphthalene-sulfonic acids, alkyl-naphthalene-sulfonic acids, condensation products of naphthalene- or naphthol-sulfonic acids with formaldehyde or of naphthalene- or naphthol-sulfonic acids and phenols, e.g. m-cresol, with formaldehyde, or reaction products of lignin-sulfonic acid with aromatic amines. Five to 300 parts of the anionic dispersing agent are preferably used per 100 parts of metal complex azo dyestuff.

The dyestuff preparations according to the invention preferably have a pH value of between 8.6 and 11.0.

The dyestuff preparations according to the invention present the particular advantage for the technique of application that they are capable of easily dissolving, without heating, 1:2 chromium and cobalt complex azo dyestuffs which contain at least one optionally mono-alkylated or -arylated sulfonamide group. In some cases, the dyestuff concentrations which can be achieved are higher than those obtainable by the normal methods, i.e. by dissolving the metal complex dyestuffs at elevated temperatures of up to 100° C. The dyestuff preparations known from the literature, in which metal complex azo dyestuffs containing sulfonamide groups are present in an aqueous solution in the form of the sodium salts of the dyestuff complex acids, which are barely soluble at 10 to 30° C., must first be dissolved at 80°–100° C. in water for dyeing, and then added to the dyebath; by comparison, the dyestuff preparations according to the invention have the advantage that they dissolve very readily in water already at temperatures of 10° to 20° C. to give, in some cases, higher dyestuff concentrations and that their application is thus substantially easier.

As against the dyestuff preparations known from British Pat. Specification No. 906,807, the preparations according to the invention require no non-ionic dispersing agents, and thus exhibit no delay of the affinity to the substrate; furthermore, it is an economic advantage that the addition of sulfanilic acid derivatives can be dispensed with. The dyestuff preparations according to the invention can be obtained by simple mixing of the components, whereas the preparations known from British Pat. Specification No. 906,807 must be prepared by dissolving the components in water and subsequent evaporation of the water.

The claimed dyestuff preparations are mainly suitable for the dyeing of materials containing nitrogen, such as leather and silk, but, above all, wool and materials of synthetic superpolyamides. Dyeing is carried out by the methods usually applied for this purpose. The dyestuff preparations according to the invention are dissolved, for example, in water at 10°–30° and the alkaline dyestuff solution is added to the dyebath which expediently contains the amounts, required for neutralization, of organic acids, e.g. acetic for formic acid, or of mineral acids, such as hydrochloric or sulfuric acid.

In practice, more strongly standardizations of alkaline wool dyestuffs, including chromium and cobalt complex azo dyestuffs, are generally avoided, because of the risk of damaging the wool. It appears that the manufactures of dyestuffs have accepted the view that alkaline wool dyestuffs cannot be offered to the user. Consequently, only neutral or weakly alkaline standardizations of dyestuffs (pH 7.5 to 8) have hitherto been customary in practice. When using the dyestuff preparations according to the invention, the risk of damage to the wool does not exist, in spite of the alkaline standardization, since the dyestuff solution is rapidly neutralized in an acidic dyebath at low temperatures.

In the following examples, the parts are parts by weight and the temperatures are given in degrees Centigrade.

EXAMPLE 1

50 Parts of the cobalt 1:2 complex of the monoazo dyestuff 2-aminophenol-4sulfonamide $\rightleftharpoons$ 1(2', 5'-dichlorophenyl) -3-methyl -5-pyrazolone are mixed with 25 parts trisodium phosphate and 10 parts of a condensation product of 2-napthol-6-sulfonic acid and formaldehyde. 40 Parts of the preparation dissolve in 1000 parts of water at 25.°

EXAMPLE 2

50 Parts of the chromium 1:2 mixed complex of the monoazo dyestuffs 2aminophenol-4-sulfonamide $\rightleftharpoons$ 2-naphthol and 4-nitro-2-aminophenol $\rightarrow$ 1-methylsulphonylamino-7-naphthol are mixed with 25 parts trisodium phosphate and 5 parts dibutylnaphthalene-sulfonate. 60 Parts of the preparation dissolve in 1000 parts of water at 25°.

EXAMPLE 3

50 Parts of the chromium 1:2 complex of the monoazo dyestuff 2-aminophenol-4sulfonamide $\rightarrow$ 1-(2',5'-dichlorophenyl)-3-methyl-5pyrazolone are mixed with 20 parts tripotassium phosphate and 2 parts di-butylnaphthalene-sulphonate. 60 Parts of the preparation dissolve in 1000 parts of water at 25°.

EXAMPLE 4

50 Parts of the chromium 1:2 complex of the monoazo dyestuff 4-chloro-2-aminophenol$\rightarrow$1-(3'-sulfonamido- phenyl) -3-methyl-5pyrazolone are mixed with 25 parts trisodium phosphate. 40 Parts of the preparation dissolve in 1000 parts of water at 25°.

EXAMPLE 5

50 Parts of the cobalt 1:2 complex of the monoazo dyestuff 2-aminophenol-4phenylsulfonamide$\rightarrow$2-naphthol are mixed with 25 parts tripotassium phosphate, 5 parts dibutyl-naphthalene-sulfonate and 30 parts of a condensation product of naphthalene-2sulfonic acid and formaldehyde. Thirty five parts of the preparation dissolve in 1000 parts of water at 25°.

EXAMPLE 6

For dyeing 5000 parts of wool yarn, 60 parts of the preparation described in example 1, which contains, the cobalt 1:2 complex of the monoazo dyestuff 2-aminophenol-4-sulfonamide $\rightleftharpoons$ 1-(2',5'-dichlorophenyl)-3-methyl-5-pyrazolone, are dissolved in 2000 parts of water at 25°. This solution is added to a dyebath containing 50 parts acetic acid (60%) and 100 parts of a condensation product of naphthalene-2sulfonic acid and formaldehyde. The dyebath so prepared is pumped through the material to be dyed at 40°-50° C. for about 10 minutes, before raising the temperature to boiling point. The dyeing is completed after a boiling time of about 45 minutes. A dyeing is obtained, which is absolutely faultless in the fastness properties and which corresponds to a dyeing which results when the amount of the same dyestuff used for dyeing is dissolved in hot water.

EXAMPLE 7

For dyeing wool top by the pad-steaming process, a dyestuff paste is prepared according to the following recipe:

Fifteen parts of the preparation described in example 3 are dissolved in 500 parts of water at 25°. To this solution is added a solution of 10 parts of a thickening agent based on carob bean flour in 300 parts of water, and the mixture is again thoroughly stirred. 20 parts of a coacervate forming auxiliary (e.g. laurylic acid diethanolamide) and 25 parts of 60% acetic acid are then added with stirring. The paste is then made up with water to a total of 1000 parts. 1000 parts of wool top are impregnated with this paste on the foulard and subsequently steamed. After washing, there results a dyeing which has the fastness properties of a dyeing which is obtained when the paste is prepared by dissolving the corresponding amount of the same dyestuff in hot water.

EXAMPLE 8

For dyeing 750 parts of yarn consisting of synthetic superpolyamide, 60 parts of the preparation described in example 2 are dissolved in 1000 parts of water at 25° C. This solution is added to a dyebath which contained 15 parts of 60% acetic acid. After briefly circulating the dyebath through the material to be dyed, the bath is heated to boiling point and then boiled for about 20 minutes. To exhaust the dyebath, further 16 parts of 60% acetic acid are added and boiling is then continued for 20 minutes. The black dyeing obtained corresponds in its fastness properties to a dyeing which results when the amount of the same dyestuff used for dyeing is dissolved in hot water.

EXAMPLE 9

18 parts of the 1:2 chromium mixed complex obtained from 4-nitro-2-aminophenol → 1-methylsulphonylamino-7-naphthol and 2-aminophenol-4-sulfonamide → acetoacetanilide, 50 parts trisodium phosphate, 12-hydrate, 29 parts of a condensation product of lignin-sulfonic acid and aniline, and 3 parts di-butylnaphthalene-sulfonate are mixed. 50 parts of the mixture dissolve in 1000 parts of water at 25°.

EXAMPLE 10

20 parts of the 1:2 cobalt complex of the monoazo dyestuff 2-aminophenol-4sulfonamide → acetoacetic acid-2-ethyl-hexylamide, 19 parts of trisodium phosphate and 2 parts of di-butylnaphthalene-sulfonate are mixed. 50 parts of the preparation thus obtained dissolve in 1000 parts of water at 20°-25° C.

EXAMPLE 11

20 parts of the 1:2 chromium complex of the monoazo dyestuff 2-amino-5-sulfonamido-benzoic acid → 1-phenyl-3-methyl-5pyrazolone are mixed with 20 parts of trisodium phosphate (6-hydrate) and 60 parts of dextrin. 50 parts of the preparation thus obtained dissolve in 1000 parts of water at 20°-25° C.

EXAMPLE 12

20 parts of the 1:2 chromium complex of the monoazo dyestuff 2-aminobenzoic acid → 1-(3'-sulphonamido-phenyl)-3-methyl-5-pyrazolone are mixed with 10 parts of tripotassium phosphate. 40 parts of the dyestuff preparation thus obtained dissolve in 1000 parts of water at 20°-25° C.

EXAMPLE 13

20 parts of the 1:2 chromium mixed complex of the monoazo dyestuffs 2-aminophenol-4-sulfonamide → 1-phenyl-3-methyl-5-pyrazolone and 4-nitro-2-aminophenol → 1-phenyl-3-methyl-5-pyrazolone are mixed with 20 parts of trisodium phosphate 5 parts of benzamide, 3 parts of di-butylnaphthalene-sulfonate and 10 parts of a condensation product from lignin-sulfonic acid and aniline. 50 parts of the preparation thus obtained dissolve in 1000 parts of water at 20°-25° C.

EXAMPLE 14

20 parts of the 1:2 cobalt complex of the monoazo dyestuff 2-aminophenol-4-sulfonamide → ω-cyano-acetophenone, 40 parts of trisodium phosphate and 15 parts of dextrin are mixed. Fifty parts of the preparation thus obtained dissolve in 1000 parts of water at 20°-25° C.

EXAMPLE 15

72 parts of the 1:2 cobalt complex of the monoazo dyestuff 2-aminophenol-4-methylsulfonamide → 2-hydroxynaphthalene are mixed with 12 parts of trisodium phosphate, 12 parts of a condensation product from lignin-sulfonic acid and aniline as well as 5 parts of benzamide. 50 parts of the dyestuff preparation thus obtained dissolve in 1000 parts of water at 20° C.

EXAMPLE 16

50 parts of the 1:2 cobalt complex of the monoazo dyestuff 2-aminophenol-4-sulfonamide → 5,8-dichloro-1-hydroxynaphthalene are mixed with 20 parts of trisodium phosphate and 25 parts of saccharose. 45 parts of the dyestuff preparation thus obtained dissolve in 1000 parts of water at 25° C.

EXAMPLE 17

20 parts of the 1:2 chromium complex of the monoazo dyestuff 2-aminophenol-4-sulfonamide → 1,3-dihydroxy-isoquinoline are mixed with 15 parts of tripotassium phosphate. 50 parts of the preparation thus obtained dissolve in 1000 parts of water at 20°-25° C.

EXAMPLE 18

50 parts of the 1:2 chromium complex of the monoazo dyestuff 2-aminophenol-3,5-bis-sulfomethylamide → 1-phenyl-3-methyl-5-pyrazolone are mixed with 20 parts of tripotassium phosphate and 5 parts of benzamide. 45 parts of the preparation thus obtained dissolve in 1000 parts of water at 20° C.

EXAMPLE 19

100 parts of the 1:2 cobalt complex of the monoazo dyestuff 4-chloro-2-aminophenol → 2-hydroxynaphthalene-6-hydroxyethyl-sulfonamide are mixed with 10 parts of trisodium phosphate and 35 parts of saccharose. 50 parts of the preparation thus obtained dissolve in 1000 parts of water at 20°-25° C.

EXAMPLE 20

40 parts of the 1:2 cobalt complex of the monoazo dyestuff 4-chloro-5-sulfonamido-2-aminophenol → 3-hydroxythionaphthene are mixed with 20 parts of trisodium phosphate (6-hydrate). 45 parts of the preparation thus obtained dissolve in 1000 parts of water at 20°-25° C.

EXAMPLE 21

50 parts of the 1:2 chromium complex of the monoazo dyestuff 4-chloro-2-aminophenol → 1-hydroxy-8-acetylaminonaphthalene-3-sulfonamide are mixed with 12 parts of tripotassium phosphate, 10 parts of a condensation product of lignin-sulfonic acid and aniline as well as 3 parts of di-n1butylnaphthalene-sulfonate. 50 parts of the preparation thus obtained dissolve in water at 20°-25° C.

EXAMPLE 22

40 parts of the 1:2 chromium complex of the monoazo dyestuff 4-chloro-5-nitro-2-aminophenol⟶3,6-bis-sulfonamide-1-hydroxynaphthalene are mixed with 15 parts of trisodium phosphate and 20 parts of saccharose. 50 parts of the dyestuff preparation thus obtained dissolve in 1000 parts of water at 20°-25° C.

EXAMPLE 23

60 parts of the 1:2 cobalt complex of the monoazo dyestuff 5-nitro-2-aminophenol⟶2-aminonaphthalene-6sulfonamide are mixed with 19 parts of tripotassium phosphate. 45 parts of the dyestuff preparation thus obtained dissolve in 1000 parts of water at 20° C.

EXAMPLE 24

75 parts of a dyestuff which was prepared by chroming a mixture of equal parts of the monoazo dyestuff 2-aminophenol-4-sulfonamide ⟶ 2-hydroxynaphthalene, the monoazo dyestuff 4-nitro-2-aminophenol → 8-acetylamino-2-hydroxynaphthalene as well as the monoazo dyestuff 2-aminophenol-4-sulfonamide ⟶ 1-hydroxynaphthalene-3-sulphomethylene-4-ether

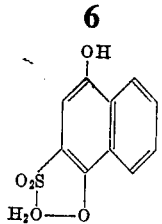

are mixed with 15 parts of trisodium phosphate and 10 parts of saccharose. 50 parts of the dyestuff preparation thus obtained dissolve in 1000 parts of water at 20°-25° C.

EXAMPLE 25

72 parts of the 1:2-chromium complex of the monoazo dyestuff 2-aminophenol-4-ethylsulfone⟶2-hydroxy-8methyl-sulfonylamino-naphthalene are mixed with 13 parts of trisodium phosphate, 12 parts of benzamide and 1 part of di-n-butyl naphthalene-sulfonate. 40 parts of the preparation thus obtained dissolve in 1000 parts of water at 20° C.

I claim:

1. A cold water-soluble dyestuff composition comprising
   A. 100 parts by weight of a 1:2 chromium or cobalt complex azo dyestuff free of reactive groupings and containing at least one sulfonamide, sulfoalkylamide or sulfoarylamide group; and,
   B. 10 to 200 parts by weight of trisodium phosphate or tripotassium phosphate.
2. A dyestuff composition of claim 1 comprising in addition,
   C. an anionic dispersing agent.
3. A dyestuff of claim 1 comprising, in addition, a material selected from the group consisting of dextrin, saccharose, sodium chloride, sodium sulfate, benzamide or lignin containing residues of sulfite waste liquor.